[19] United States Patent
Rowley

[11] 3,990,599
[45] Nov. 9, 1976

[54] REUSABLE SHIPPING CONTAINER
[75] Inventor: Edward C. Rowley, Lakeland, Fla.
[73] Assignee: Mary Edwin Thorpe Rowley, Lakeland, Fla.
[22] Filed: Aug. 5, 1975
[21] Appl. No.: 601,981

[52] U.S. Cl. .............................. 217/12 R; 217/65; 217/69
[51] Int. Cl.[2] ........................ B65D 9/12; B65D 9/34
[58] Field of Search ................... 217/65, 13, 66, 12, 217/12 R, 69; 190/37; 220/4 F, 73; 24/81 BF

[56] References Cited
UNITED STATES PATENTS

| | | | |
|---|---|---|---|
| 910,324 | 1/1909 | Sessions | 190/37 |
| 2,266,181 | 12/1941 | Epps | 190/37 |
| 2,541,846 | 2/1951 | Ullrich et al. | 220/73 |
| 2,590,159 | 3/1952 | Davis | 217/65 |
| 2,896,808 | 7/1959 | Papy et al. | 217/66 |
| 3,082,897 | 3/1963 | Highley | 217/65 |
| 3,236,405 | 2/1966 | Reil | 220/4 F |
| 3,323,674 | 6/1967 | Nist, Jr. | 217/65 |

Primary Examiner—George E. Lowrance
Assistant Examiner—Allan N. Shoap
Attorney, Agent, or Firm—B. P. Fishburne, Jr.

[57] ABSTRACT

A knock-down reusable shipping container includes completely separable top, base, end and side walls and fastener means whereby adjoining corners of the separable walls may be securely fastened in assembled relationship and quickly separated. Spring clip fasteners cooperate with reinforcing plates on the respective container walls to produce one way and two way corner connections. Economy of manufacture and minimized labor in the use of the invention are featured.

3 Claims, 8 Drawing Figures

REUSABLE SHIPPING CONTAINER

BACKGROUND OF THE INVENTION

Various knock-down and reusable containers are known in the prior art, and the objective of the present invention is to improve on the prior art by the provision of a more economical reusable shipping container which is extremely rugged and durable and requires minimum labor and the mere use of a screwdriver or equivalent prying implement to assemble and disassemble. The fastener components of the reusable container are economical to manufacture from sheet metal and are very rugged and durable and are applicable to various types of container panels.

Other features and advantages of the invention will become apparent during the course of the following description.

BRIEF DESCRIPTION OF DRAWING FIGURES

DETAILED DESCRIPTION

Figure 1:
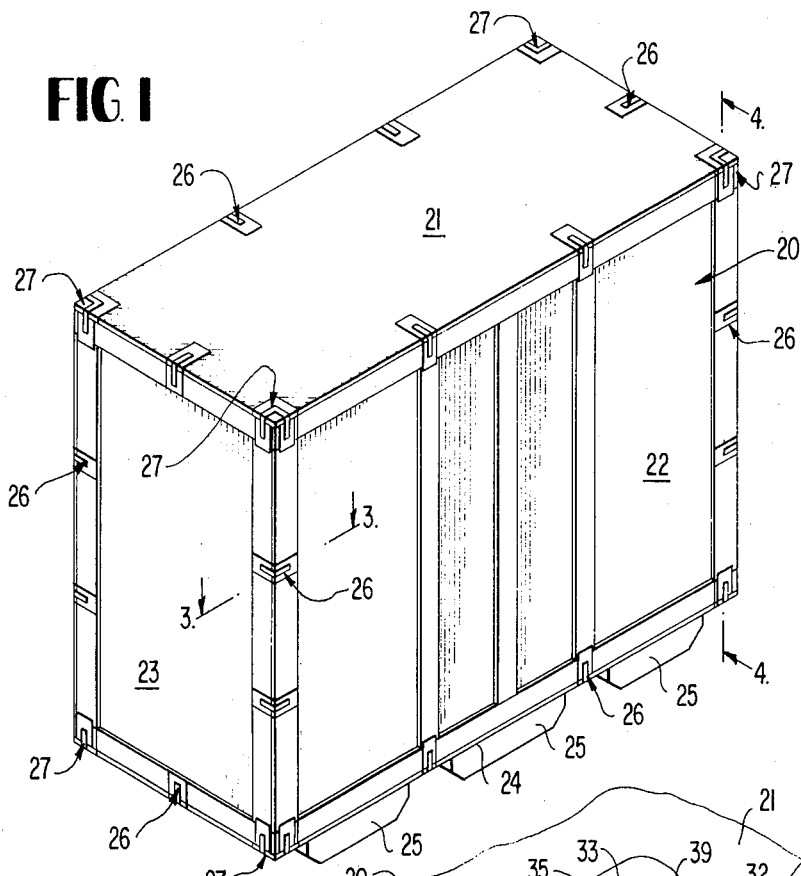
FIG. 1 is a perspective view of a typical reusable shipping container embodying the invention, partly schematic.

Referring to the drawings in detail, wherein like numerals designate like parts, and referring first to FIG. 1, the numeral 20 designates a knock-down reusable shipping container embodying the invention and being formed of plywood or the like and being of rectangular form when erected. The container 20 includes a top wall 21, identical side walls 22 and end walls 23 and a base or bottom wall 24 which may have attached skids 25, if desired, adjacent the side walls 22. The details of construction of the plywood panels or walls forming the container 20 may be varied, and the shape and size of the container may be varied, without departing from the invention.

Fastener assembly means, now to be described, are employed at a plurality of points on the corners of the container 20 to secure it in assembled relationship and to render it quickly separable when desired by the mere use of a screwdriver or equivalent instrument. The fastener assembly means comprises plural identical one way fastener assemblies 26 and plural identical two way fastener assemblies 27 as depicted in FIG. 1. The one way fastener assemblies 26 are employed at strategic points along the vertical and horizontal corners of the container 20 while the two way fastener assemblies 27 are utilized at the eight compound or cubic corners of the container.

Figure 2:
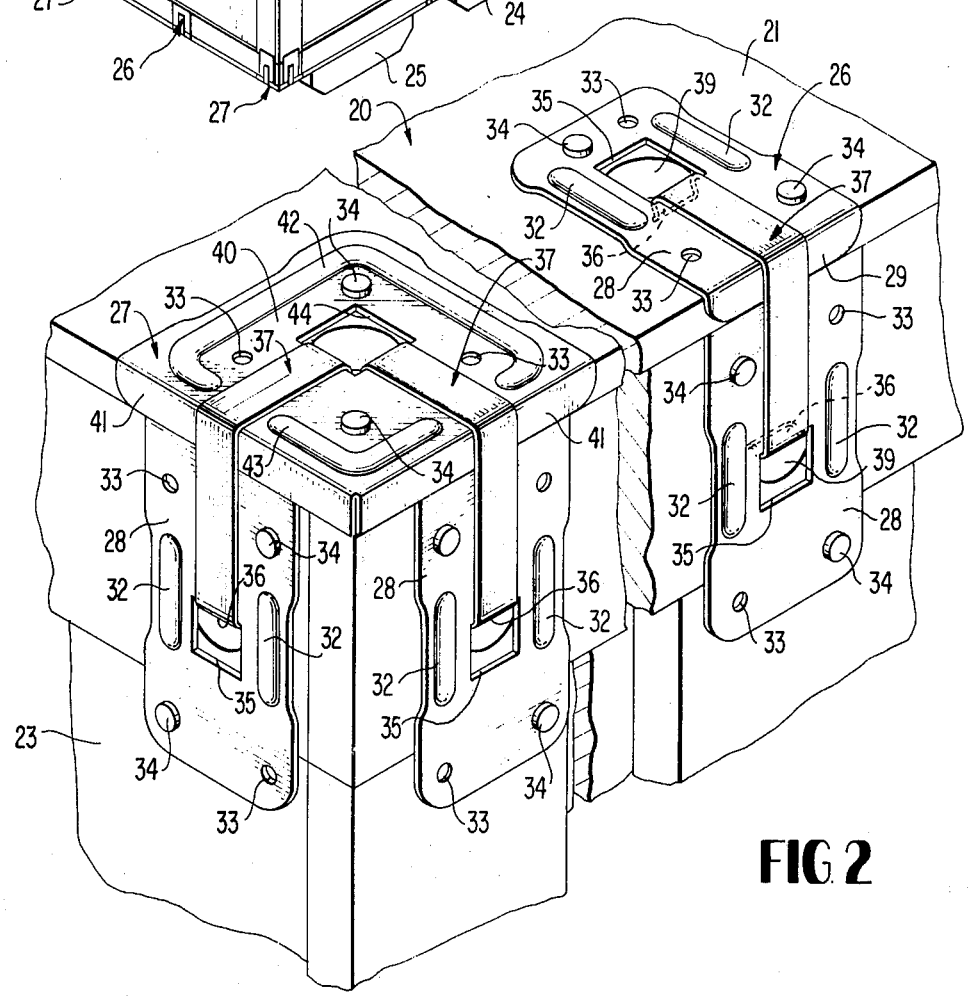
FIG. 2 is a fragmentary perspective view of a container and one and two way fastener assemblies employed thereon.

FIG. 2 depicts one of the one way fastener assemblies 26 and one of the two way fastener assemblies 27 in detail. A single description of each type of fastener assembly 26 and 27 will serve to describe them all.

Figure 3:
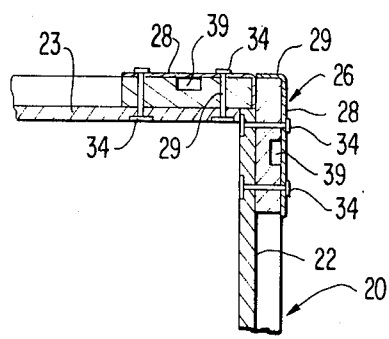
FIG. 3 is a fragmentary horizontal cross sectional view taken on line 3—3 of FIG. 1.

Each one way corner fastener assembly 26 comprises a pair of identical reinforcing metal plates 28 each having a single end right angular flange 29 to lap one vertical or horizontal edge 30 or 31 of the particular container wall carrying the plate 28. Each plate 28 is externally ribbed at 32 for added rigidity and has preferably four corner openings 33 for the reception of rivets 34 which serve to rigidly connect the plates 28 to their respective container panels. FIG. 3 shows the right angular relationship of a pair of the plates 28 in one of the one way fastener assemblies 26 on a vertical corner of the container 20. This is the same construction employed in the fastener assembly 26 for the horizontal corner illustrated in FIG. 2. In that figure, the right angular flange 29 of the vertically disposed plate 28 is concealed beneath the container top wall 21 and projects inwardly from the visible flange 29.

Figure 8:
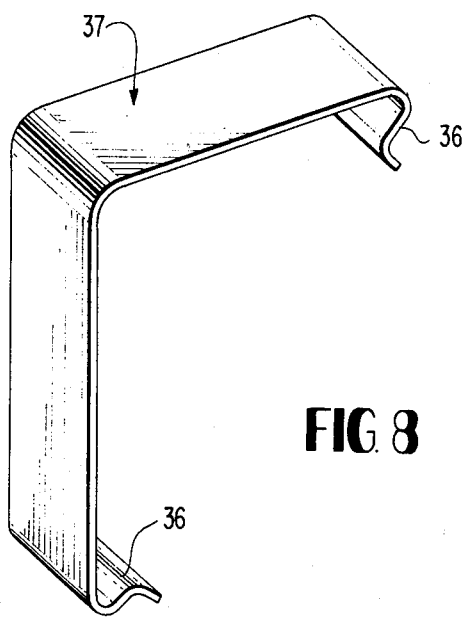
FIG. 8 is a perspective view of a fastener assembly spring clip employed in both the one and two way fastener assemblies of the invention.

As shown in FIG. 2, each plate 28 has a generally central rectangular opening 35 formed therethrough to receive one end terminal 36 of a right angular symmetrically formed spring steel clip 37 having equal length arms. The clip terminals 36 at the ends of its arms are reversely bent as shown in FIG. 8 to snap over one straight edge 38, FIG. 5, of the rectangular opening 35 receiving it. The underlying container walls or panels are recessed at 39 to accommodate the clip terminals 36. The spring clips 37 are omitted in FIGS. 3 and 4 for clarity and details of the fastener assemblies 26 and 27 are omitted in FIG. 1 for the same reason. As shown in FIG. 2, the spring clip 37 lies flat against the right angular faces of the two reinforcing plates 28 and no parts of the assembly 26 project above the ribs 32 which serve to protect the clip from contact with exterior objects. The spring clip may be tapped into place manually as with the handle of a screwdriver and the terminals 26 may be separated from the openings 35 by insertion therethrough of the blade or tip of the screwdriver which can then lift the terminals 36 free from the adjacent edge 38 with which they are interlocked. The connection formed between the adjacent container walls by the one way assembly 26 is extremely strong and secure. At the same time it is quickly releasable and easy to re-establish at any time.

The two way fastener assembly 27 at each cubic corner of the container comprises one pair of the described reinforcing plates 28 on adjacent right angular container walls such as the walls 22 and 23 and a third coacting substantially square reinforcing plate 40 on a third wall of the container forming a cubic corner, such as the top wall 21 or the bottom wall 24. The application of the two plates 28 to the walls 22 and 23 is as previously described in FIGS. 2 and 5 for the one way assembly 26. The right angular flanges 29 lap the upper edges of the walls 22 and 23, as described.

Figure 4:
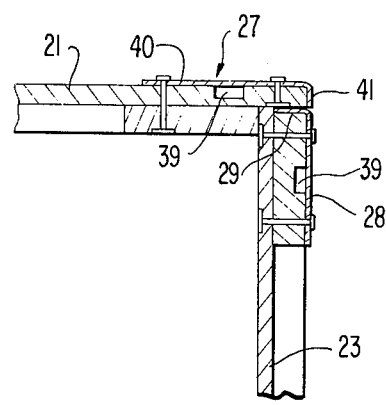
FIG. 4 is a fragmentary vertical section taken on line 4—4 of FIG. 1.
Figure 4:
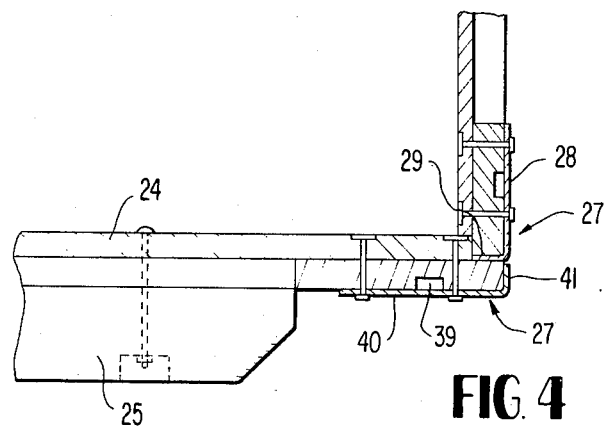
Figure 5:
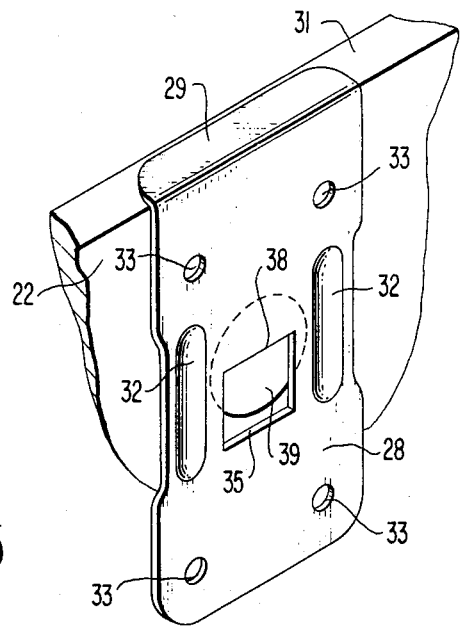
FIG. 5 is a perspective view of a one way fastener assembly reinforcing plate.
Figure 6:
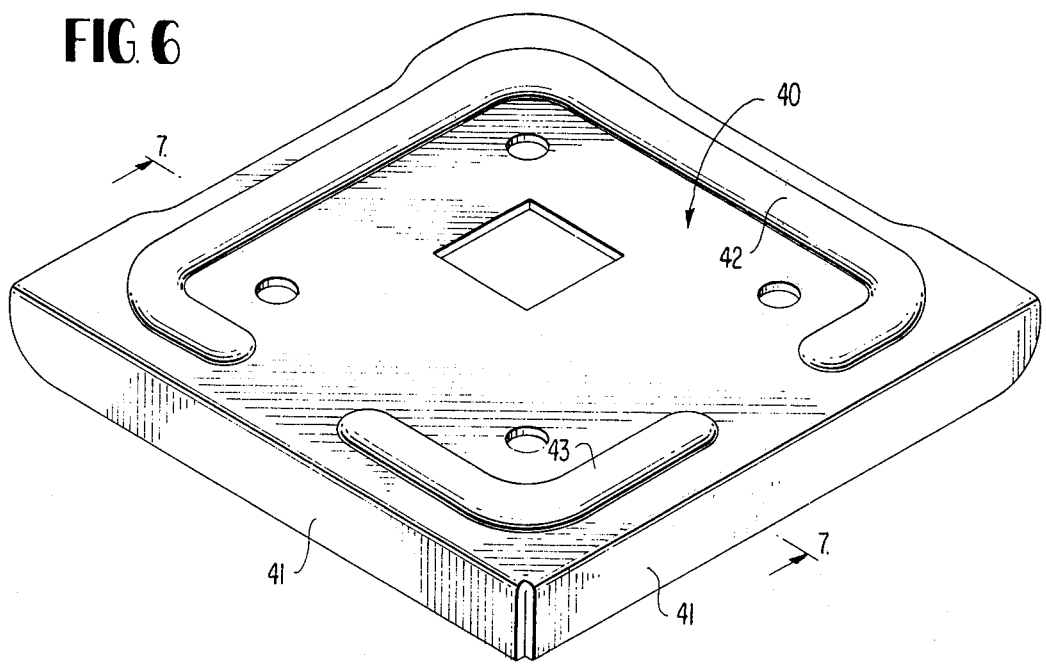
FIG. 6 is a perspective view of a two way fastener assembly reinforcing plate.
Figure 7:
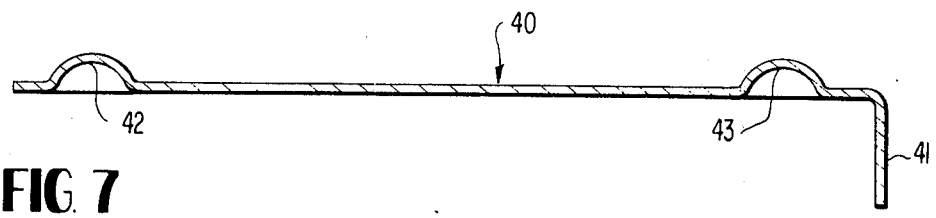
FIG. 7 is a vertical section taken on line 7—7 of FIG. 6.

Additionally, the two way plate 40 has a pair of right angular flanges 41 which lap the adjacent edges of the wall or panel 21 and lie adjacent to the two plates 28, see FIG. 4. The two way plate 40 is externally ribbed at 42 and 43 near its margins for rigidity and to protect the two spring clips 37 that are employed at right angles to each other, FIG. 2, in the two way assembly 27. The ribs 42 and 43 are interrupted to accommodate the clips 37 whose legs or right angular portions lie flush against the plates 28 and 40. The plate 40 has a single generally central square opening 44 formed therethrough, and two adjacent right angular edges of this opening receive a pair of the spring clip terminals 36 in interlocking releasable relationship as described in connection with the one way assembly 26. The other two corresponding terminals 36 of clips 37 interlock with edges of the openings 35 in the pair of plates 28 used in the two-way assembly 27. It should be apparent from an inspection of FIG. 2 that the two way fastener assembly 27 rigidly and releasably interconnects three adjacent walls or panels of the rectangular container 20 at each compound or cubic corner thereof. It should be mentioned that the plate 40 also has apertures 33 to receive rivets 34 used to attach the plate 40 to its associated container wall.

By placing the two way fastener assemblies 27 at the eight cubic corners of the container 20 and arranging the one way fastener assemblies 26 at spaced intervals along all of the horizontal and vertical corners of the shipping container, the separable walls of the latter are secured in assembly with great strength to resist bursting. At the same time, with a very minimum effort, all container walls can be knocked down flat and the only tool required for this is a screwdriver to remove the several clips 37.

The advantages of the invention should be readily apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a knock-down reusable shipping container having separable panels adapted to be assembled into a rectangular box form, plural separable fastener assemblies for pairs of said panels which define right angular corners on the shipping container, each separable fastener assembly comprising a coacting pair of reinforcing plates and means to secure said reinforcing plates fixedly on the outer faces of said panels forming a right angular corner, each reinforcing plate having an integral right angular flange on one end thereof lapping the adjacent edge of the panel on which the reinforcing plate is mounted, whereby said flanges resist movement of the reinforcing plates by abutment with said panel edges, each reinforcing plate of the fastener assembly having a substantially central opening formed therethrough and said opening having at least one straight edge, the straight edges of the two reinforcing plate openings being substantially parallel in the fastener assembly, the adjacent pair of panels having clearance recesses formed in their outer faces in registration with the reinforcing plate openings, and a substantially right angular spring sheet metal clip adapted to span the container corner on the exterior faces of said reinforcing plates and having opposite end locking terminals projecting inwardly from the arms of said clip and having interlocking engagement with said straight edges of the reinforcing plate openings, said panel clearance recesses receiving said clip locking terminals and allowing insertion of a clip separating blade through one of said reinforcing plate openings and into the adjacent panel recess.

2. The structure of claim 1, wherein said reinforcing plate openings are square and of a width only slightly greater than the width of said clip so that the latter when in place on the container cannot shift laterally in either direction relative to the associated reinforcing plates.

3. The structure of claim 2, and said clip locking terminals comprising generally S-shaped terminals on the ends of the clip arms which snap over and lock beneath said straight edges while projecting into the clearance recesses.

* * * * *